March 12, 1940.   J. H. K. McCOLLUM ET AL   2,193,487
MANUALLY CONTROLLABLE AUTOMATIC CLUTCH-OPERATING MECHANISM
Original Filed Jan. 17, 1931
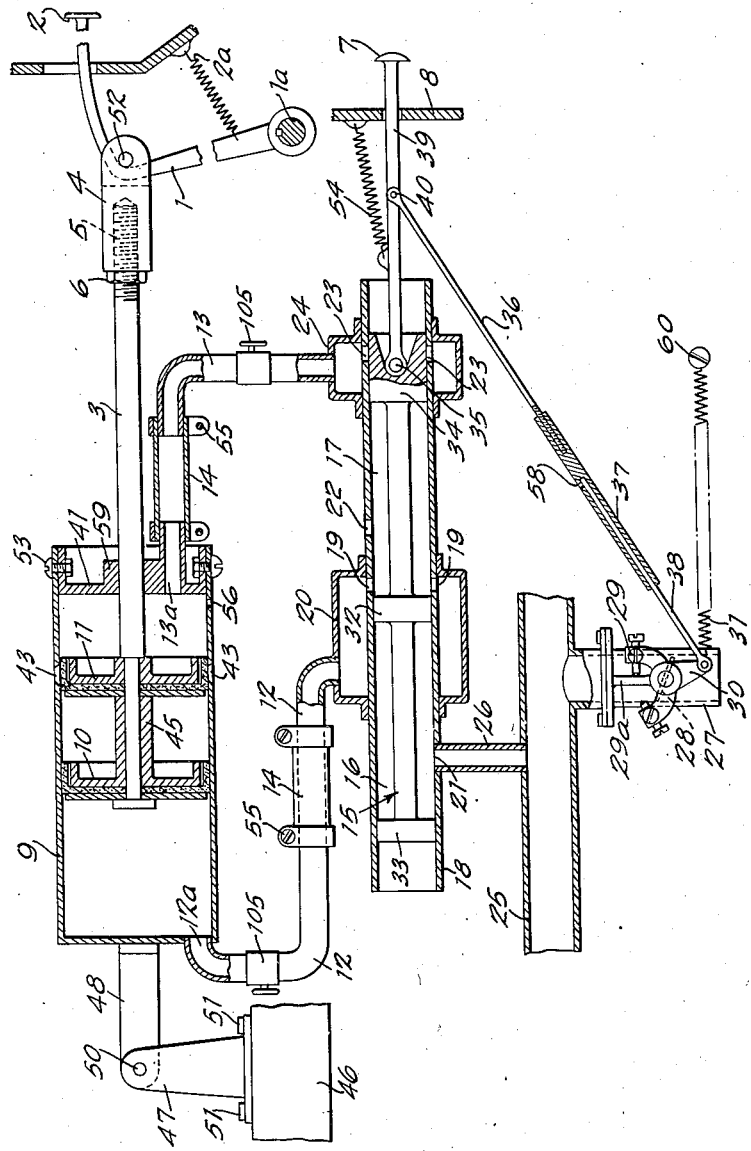
INVENTOR
Henry J. DeN. McCollum.
James. H. K. McCollum.
BY
ATTORNEY Patented Mar. 12, 1940

2,193,487

UNITED STATES PATENT OFFICE 2,193,487

MANUALLY CONTROLLABLE AUTOMATIC CLUTCH-OPERATING MECHANISM

James H. K. McCollum and Henry J. De N. McCollum, Evanston, Ill.

Original application January 17, 1931, Serial No. 509,310. Divided and this application January 17, 1934, Serial No. 706,934

23 Claims. (Cl. 192—.01)

This invention relates generally to automatic clutch operating mechanism such as is now quite commonly used on motor cars propelled by gas engines to relieve the car driver from independently and directly opening and/or closing the power transmitting clutch during many periods of car operation, said mechanism automatically disengaging such clutch whenever the throttle of the gas engine is closed to idling position, and permitting the clutch to engage when such throttle is opened.

In such mechanism it is important that the clutch engaging movement of the clutch lever, or other clutch actuating element, which usually is normally biased to occupy a clutch closing or engaging position, shall occur in two stages, i. e. a first stage which will move the clutch elements proper up to initial engagement and shall be as rapid as is conveniently possible, and thereafter a second, slower stage for completion of the clutch engagement,—this latter to prevent "grabbing of the clutch" and sudden jerking of the car.

Various forms of apparatus for producing such two-stage operation in the automatic closing or engaging of a clutch, are shown and described in our co-pending application Ser. No. 509,310, filed January 17, 1931, of which this present application is a division.

Such two-stage operation of the clutch operating mechanism becomes further important, in ordinary cases of starting or accelerating the movement of a motor car, when such clutch operating mechanism operates contemporaneously with the throttle opening mechanism, as here shown. This results because if the entire clutch closing movement of the clutch actuating member is slow, the motor will race before the clutch engages, and, as a result of this racing at the moment of clutch engagement the clutch may be burned. Some two-stage mechanism is therefore necessary and generally used, but we have found, however, that in certain cases, or emergencies, where a very quick start or a rapid getaway is required, it is desirable to temporarily render the two-stage mechanism less effective by cutting out the slower second stage wholly or partially and allowing the entire clutch closing movement of the clutch actuating member or element to take place more rapidly.

The invention herein described is mainly designed to produce this result by providing a control mechanism for the clutch operating device which shall include a member controllable for rendering the automatic two-stage producing means less effective for retarding the latter portion of the clutch closing operation, and then connecting that to the accelerator pedal or other throttle controlling member so that when the accelerator is moved far enough in a throttle opening direction to produce a quick starting, or rapid acceleration, of the car, the two-stage producing means then becomes more or less ineffective.

Also the present invention is designed to produce a two-stage clutch operating mechanism of the class above indicated, which is adjustable to compensate for wear of the clutch faces, so that the beginning of the second, slower stage of the clutch closing movement may always be caused to occur substantially contemporaneously with the initial contact of the clutch faces.

All of the forms of apparatus shown in the drawings of our prior application Ser. No. 509,310 disclosed the above mentioned features of our original invention, but for the purpose of illustration here we have selected the accompanying figure of drawing which was marked "Fig. 2" in our said prior application, and which is a diagrammatic vertical section of a power-operated clutch controlling apparatus with its attachment to certain parts of a motor car, which latter parts are shown broken away, both ends of the power cylinder being closed.

In said drawing an embodiment of our invention is shown in which the clutch is actuated by a pneumatic cylinder containing a piston which is drawn inwardly to disengage the clutch when the interior of that end of the cylinder is connected to the intake manifold of the motor, and the clutch engagement is produced by the action of the usual clutch springs when the connection to the intake manifold has been cut off and air is allowed to enter the cylinder to equalize more or less nearly the pressures on the two sides of the piston. The clutch closing motion of the piston is produced in two stages by means of automatic control of the outflow of air from the right hand end of said cylinder.

In the form here shown air is freely admitted to the vacuum space in the left hand end of the cylinder during the entire outward stroke of the piston, but during the latter portion thereof air is trapped in the other, closed, end to act as an air cushion to check its speed of final movement.

Referring to the drawing, the usual clutch pedal of a motor car is shown at 2, a portion of the chassis of which car is shown at 46. This pedal is mounted on the clutch lever 1, which is keyed to the clutch operating shaft 1ª and normally held in a clutch engaging position by the tension of the spring 2ᵃ.

25 is a section of the intake manifold of the motor to which the combustible mixture is admitted through the carburetor 27 having a throttle valve 28 of the usual butterfly type operated by the throttle lever 30 and limited in its movements by the adjustable stop mechanism 29 cooperating with the fixed stop rib 29ᵃ. This throttle valve is normally held in nearly closed or idling position by the spring 31 anchored at 60. It can be opened by motion of the pedal 7 mounted on rod 39 projecting through foot-board 8 and having a pivotal connection at 40 to the accelerator rod 36 which has a lost motion connection to the throttle rod 38 which is pivoted to the throttle lever 30. The cup-shaped sleeve 37 is adjustably mounted on the end of the rod 36 by means of the screw thread connection there shown. Throttle rod 38 slides in this sleeve and when the pedal 7 is fully retracted by the action of spring 54, there is a gap left between the end of rod 38 and the bottom of cup-shaped sleeve 37. Ports 58 admit air to this space so as to permit free movement of the parts. When the pedal 7 is forced by the operator's foot toward the left the first action of this portion of the apparatus will be to take up the lost motion and thereafter subsequent movement of the pedal will cause opening movement of the throttle valve.

The power mechanism for operating the clutch shown in this figure comprises the vacuum cylinder 9 which is pivotally mounted on the chassis 46 by means of the pedestal 47 fastened to the chassis by screw bolts 51, 51, and the lug 48 projecting beyond the closed end of the cylinder and hinged or pivoted to the pedestal 47 at 50.

On the outer end of the piston rod 3 is the screw thread 5 by means of which it is adjustably connected to the fork 4 which carries the pin 52 in its open end, forming a pivotal connection with the pedal lever 1. There is a locknut 6 on the piston rod. 12 is a conduit connected to the left hand end of cylinder 9 by the port 12ᵃ and connected at its other end to the annular port casing 20 on the casing 18 of the piston valve 15. A short section of rubber hose 14 is inserted for joining two portions of the conduit 12 and forming an air-tight connection therewith by means of the hose clips 55. The intake manifold 25 is connected by conduit 26 to the interior of valve casing 18 through port 21. Port casing 20 is connected to the interior of said valve casing 18 by a plurality of ports 19. The piston valve 15 has two sections reduced in diameter, forming annular valve spaces 16 and 17 within the casing 18. The full diameter piston portions of the valve, 32 and 33, cooperate with the ports 19 and 21 respectively as the valve is reciprocated, being so spaced apart that when the piston valve is moved to the right so that the piston portion 32 passes to the right of ports 19, communication will be afforded from the intake manifold 25 to the cylinder port 12ᵃ. The cylinder 9 is also provided with a plurality of ports 43 in its walls at a point intermediate of its ends. There is another annular port casing 24 which surrounds a plurality of ports 23 near the right-hand end of the valve casing 18. The piston valve 15 is connected to the pedal 7 and valve rod 39 by wrist-pin 35. The right hand end of the piston valve has a full diameter section 34 which reciprocates across the ports 23.

The cylinder head 41 is air-tight with the exception of the port 13ᵃ which is connected by conduit 13 to port casing 24 on the valve casing 18. In order to produce an earlier checking of the outward movement of the piston rod 3 than would otherwise occur, the second piston 11 may be mounted thereon as shown, being spaced away from the main piston 10 by spacing sleeve 45. Port 22 in valve casing 18 is open to the atmosphere. There is no cutting off of the inflow of air to the suction end of cylinder 9 during the outstroke of the piston to produce a slower final stage of movement thereof in this particular embodiment of our invention since air flows in freely through ports 22 and 19 and conduit 12 to the lefthand end of cylinder 9 throughout each such outstroke of piston 10, but there is, on the other hand, a trapping of air in the right hand end of the cylinder after the false piston 11 has lapped the ports 43, which serves this retarding purpose, the air so trapped being expelled gradually through the leakage port 56, which in this case is in the cylinder wall near the right hand end of said cylinder. Also, air flows in freely through ports 12 and 23 and conduit 13 to the space at the righthand end of the cylinder during each entire instroke of pistons 10 and 11, thus permitting the quick clutch disengagement which is so necessary during gear shifting operations.

The operation of the construction here shown and above explained may be described more in detail as follows:

The clutch is held in initial engagement with the proper percentage of the full clutch engagement pressure to give a smooth, jerkless start from a standstill by having that part of the cylinder 9 to the right of the false piston 11 airtight, practically, so as to form an air cushion which is slowly reduced in effectiveness, like that of a pneumatic door check, when the ports 23 are closed by the right hand edge of piston portion 34 of the piston valve 15, when it is in the position shown, so that, when the piston 11 has closed the ports 43, air is trapped in the right hand end of the cylinder and the pistons 10 and 11 can only move very slowly to the right thereof as the trapped air slowly escapes through leakage port 56. But if the pedal 7 is moved to the left sufficiently to open the ports 23 to the atmosphere so that the space in cylinder 9 to the right of the piston 11 is then directly connected to the atmosphere, the pistons 10 and 11 will move to the right, from any position in the cylinder 9, rapidly and give the clutch its full engagement pressure much more quickly. This is the procedure when a rapid start, or a very quick "getaway" is required. Usually, however, in starting the car or in making an ordinary "getaway", after the pistons 10 and 11 have reached the position shown, the pedal 7 will first be moved slightly farther to the left without the right hand piston portion 34 of the valve 15 opening the ports 23, so that the engine can then develop the proper small amount of additional power to give the ideal, smooth and jerkless start from a standstill, the clutch having been engaged with only the proper percentage of the full engagement pressure for the said start from a standstill, and the complete engagement later resulting from gradual leakage of air from the air cushion in the right hand end of cylinder 9 through leakage port 56.

When it is desired to free wheel, or coast, the pedal 7 is allowed to move as far to the right as it will go under the action of spring 54, and the intake manifold 25 of the engine, with the maximum vacuum then existing therein because the carburetor throttle valve is in idling position, will be connected to the part of the interior of cylinder 9 to the left of the piston 10, thereby fully disengaging the clutch, by the action of the vacuum sucking said pistons to the left.

When the pedal 7 is in the farthest position to the right, the cup-shaped sleeve 37 has slid to the right on the rod 38, after the throttle closed, thus leaving a gap between the end of the rod 38 and the bottom of the said sleeve 37 which is mounted on the end of rod 36; but with the parts in the position shown the end of the rod 38 is in contact with the bottom of said sleeve 37 so that the throttle is operated by any further movement of pedal 7 to the left, the clutch lever 1 slowly swinging to the right during the second stage of its clutch closing movement. Hole 58 in sleeve 37 serves to prevent air locks, which might prevent quick opening of such gap.

Three-way valves 105 of any desired construction can be inserted in the conduits 12 and 13 so as to connect either or both ends of the cylinder 9 to the atmosphere continuously, and simultaneously disconnect the rest of the mechanism from said cylinder, if it is desired to run the car in the ordinary manner without using our invention; or the piping can be so arranged as to permit the use of one double three-way combination valve for these purposes.

The spring 54, yielding to a light tension, allows of an additional resistance being felt by the operator's foot resting on pedal 7 whenever the end of rod 38 comes against the bottom of the tubular member 37 on the end of rod 36, the added resistance of spring 31 then coming into action as the throttle of the carburetor 27 then begins to open slowly from the idling position. When this resistance is felt by the foot the operator will know that the right position of the parts for using the engine as a brake, or for running the car slowly with the carburetor in idling position, has been obtained, because this resistance can be felt by the foot without even moving the carburetor throttle valve from its idling position. In fact the best position for the parts for using the engine as a brake is just at the point where this resistance is felt by the foot, the carburetor throttle being still in an idling position.

Another useful function of these sequentially increasing yielding resistances to the movement of the accelerator 7 in a clutch closing direction results from the fact that when the increase of resistance caused by initial flexure of spring 31 is felt by the operator's foot he can tell that initial clutch engagement is then occurring, or is on the verge of occurring. Consequently he is thereby warned to check the accelerator movement sufficiently to avoid a too sudden completion of such clutch engagement, such as might jerk the car too sharply.

If desired, the ports 56 can be dispensed with as there probably will be enough leakage of air passing piston 10, or around piston valve 15, to allow complete clutch closure to be ultimately effected, even if the carburetor throttle is not opened sufficiently to cause the corresponding movement of valve piston 34 necessary to open ports 23, and so permit an outflow of air from cylinder 9 through conduit 13.

Also, another method of using the engine is a brake can be employed in any case; that is, the pedal 7 can be moved far enough to the left to give a rapid and full engagement of the clutch as above described, and then such pedal can be allowed to move back to the right until a reduced pressure against the operator's foot, caused by the cessation of the effective tension of the spring 31, can be felt, thus bringing the parts into the position shown.

While the car is free wheeling at a high speed, if the parts are put into positions shown, the engine, which is then idling, can be picked up, i. e. connected to the driving shaft and rear axle and brought up to a speed corresponding to that at which the car is moving, without any jar or jerk being felt. Thereafter pedal 7 can be moved farther to the left to give the clutch its full engagement and to thereafter increase the power of the motor to any desired extent.

The two-stage action shown can be obtained by various other forms of mechanism involving mere reversals or rearrangements of the parts here shown, said reversed or rearranged parts still operating on the same general principle. Other forms of valve could be substituted for the piston valve 15 here shown, and such valves could be operated by and in conjunction with other forms of mechanism to control flow of air to and from a pneumatic servo-motor to produce substantially the same result as here described, without departing from the underlying principles of operation herein explained with reference to the particular forms of mechanism here shown.

The rubber hose sections 14, 14, will not collapse even under the maximum partial vacuum created in them, if made with thick walls, such as are now common in the hose use on tire pumps.

It will be obvious from the foregoing description that we have disclosed a two-stage clutch closing mechanism which operates automatically to retard the later stages of the clutch closing movement so long as the member 34 of the controlling valve 15 laps the ports 23, but that, on moving said valve to the left by pushing the accelerator 7 far enough to open the throttle 28 widely, the ports 23 will also thereupon be opened and such automatic means for retarding the clutch closing movement thereby rendered more or less ineffective.

It may be observed that after the piston portion 32 of valve 15 has been moved past ports 19 (into the position shown in the drawing) the vacuum space in the left hand end of cylinder 9 is not only cut off from communication with the intake manifold 25, but is also freely connected (through ports 19, annular valve space 7 and port 22) with the atmosphere, so that air may rush unrestrainedly into the left hand end of cylinder 9 as springs 2ª pull pistons 10 and 11 to the right. This leaves the control of the second, and slower stage of clutch closing movement to the air compressed in the right hand end of said power cylinder. The two-stage action might, of course, be otherwise produced, but the particular principles of the invention of the two-stage disabling means hereinbefore described may be similarly applied to such other forms.

The piston 32 of valve 15, in cooperation with port 19 in valve casing 18 connected to the interior of the pneumatic motor cylinder 9, port 22 in said casing opening to the air, and port 21 therein connected to the intake manifold 25, together constitute a three-way valve serving to connect the interior of the left hand end of said cylinder 9 alternately with the source of vacuum, or with the atmosphere, for the purpose of reciprocating the piston 10 which operates the clutch.

Having described our invention, we claim:

1. In an apparatus of the class described, the combination of a throttle controlling the power developed by the engine of the motor car, a clutch-actuating element normally biased to occupy a clutch closing position, a power device operatively connected to such element and operative to move it into clutch opening position, automatic means, operative as such clutch actuating element approaches clutch closing position, for retarding such movement thereof, and a control mechanism for said power device including a member controllable for rendering said automatic means more or less ineffective for so retarding such movement of said clutch actuating element; said member being operatively connected to said throttle; whereby said throttle and said member can be manually operated in unison.

2. Apparatus of the character described adapted for use on a motor car equipped with a gas engine for propelling it, a throttle for such gas engine controlled by an accelerator pedal normally biased to hold said throttle in nearly closed position for idling the engine, and a clutch actuating element normally biased toward a clutch closing position, said apparatus comprising the combination, with a power device operatively connected to such element and operative to move it into a clutch opening position, of automatic means, operative as such clutch actuating element approaches clutch closing position, for retarding such movement thereof, and a control mechanism for said power device including a member controllable for rendering said automatic means less effective for so retarding such movement of such clutch actuating element; said last mentioned control mechanism being operatively connected to such accelerator pedal in such manner that when such accelerator is moved far enough in a throttle opening direction to produce a very considerable acceleration of the speed of revolution of the engine, said mechanism will thereupon render said automatic means less effective for retarding the clutch closing movement of such clutch actuating member, and thereby permit a rapid completion of such movement.

3. In an automobile equipped with a gas engine for propelling it, a reciprocable clutch actuating element normally biased toward clutch-closing position, a throttle valve for controlling the power output of such engine, and an accelerator pedal for manipulating such throttle, the combination, with such above described apparatus, of a servo-motor mounted on the automobile and operatively connected to such clutch-actuating element by means adjustable as to length such that it will move such element in a clutch opening direction when said servo-motor is energized; said motor being also adapted to permit the biased clutch-closing movement of such element when deenergized and being equipped with automatic means, operative as such clutch-actuating element approaches clutch-closing position, for retarding such movement thereof at about the moment it reaches the position producing initial contact of the clutch elements, together with a control mechanism for said servo-motor including a member connected to such accelerator pedal and thereby controllable for rendering said automatic means less effective for so retarding such movement of such clutch-actuating element contemporaneously with any wide opening of the engine throttle; whereby the initiation of such clutch retarding action may be maintained substantially synchronous with the initiation of contact between the clutch elements by adjusting the length of said servo-motor connection from time to time as the contacting faces of said clutch elements wear down in use.

4. In a power clutch operating mechanism for an automotive vehicle provided with an intake manifold, a throttle and a clutch, a double-ended fluid motor, a connection between said motor and clutch, a fluid transmitting connection between one end of said motor and manifold, a three-way control valve in said connection, a bleed valve, common means for operating said throttle, bleed valve and three-way valve, and a fluid transmitting connection between the other end of said motor and said bleed valve.

5. In automatic clutch operating mechanism for automobiles having a throttle and an accelerating device controlling the throttle, a power device, a clutch actuator connected to the power device for operation thereby, main valve means for controlling said power device, means under control of the accelerating device for actuating said valve means, and other accelerating device actuated means for said power device operating to effect variable relief upon actuation of the accelerating device.

6. In automatic clutch operating mechanism for automobiles having a throttle and an accelerating device controlling the throttle, a power device, a clutch actuator connected to the power device for operation thereby, main valve means for controlling said power device, means under control of the accelerator for actuating said valve means, and other accelerating device actuated means for said power device operating to effect relief which is progressively greater as the accelerating device is progressively depressed.

7. In automatic clutch operating mechanism for automobiles having a throttle, an accelerator for operating the throttle, a power device, a clutch actuator connected to the power device for operation thereby, means providing a dash pot action of the power device in the direction of clutch engagement, and means associated with said accelerator for effecting, when the accelerator is depressed, first, movement of the clutch actuator in the direction of clutch engagement, second, opening movement of the throttle, and third, dash pot action of the power device in the direction of clutch engagement.

8. In an automobile with its clutch, the combination of a clutch actuator and mechanism for automatically operating said clutch actuator, said mechanism including a power cylinder having port means effecting quick movement of the actuator for the first portion of its movement in the direction of clutch engagement and slow movement of the actuator in the remaining portion of its movement in the direction of clutch engagement, and accelerator controlled means for said power cylinder adapted to control the rate of movement in said remaining portion.

9. In an automatic clutch operating mechanism for automobiles having a throttle and throttle operating means, a source of vacuum, a vacuum cylinder and piston mechanism provided with means for vacuum connection and for air relief, and means for controlling the air relief associated with said cylinder and piston mechanism to afford relatively unrestricted relief during the first part of a stroke of the piston and controllable relief for the remainder of such stroke including valve means influenced in its action by manipulation of said throttle operating means.

10. In automatic clutch operating mechanism for automobiles having a throttle and throttle operating means, a source of vacuum, a vacuum cylinder and piston mechanism, control valve means for said mechanism providing vacuum connection and air relief, valve means connected to be moved by the piston for controlling the air relief, and valve means connected to be moved by the throttle operating means for controlling the air relief.

11. In automatic clutch operating mechanism for automobiles having a throttle and throttle operating means, a source of vacuum, a vacuum cylinder and piston mechanism, a manually operated control valve for said mechanism providing vacuum connection, a valve connected to said piston for movement therewith to provide air relief for said mechanism and a valve connected to the throttle operating means for movement therewith to provide air relief for said mechanism.

12. In an apparatus for actuating by fluid pressure a movable member of a mechanism adapted to operate a power transmitting clutch such as is employed in motor cars, the combination, with said above described apparatus, of automatic means adapted to produce a relatively rapid flow of the fluid to effect a correspondingly rapid clutch engaging movement of said clutch operating member followed by a relatively slower flow of said fluid during the final stages of said engaging movement, comprising a cylinder containing a piston and having a closed end through which the piston rod projects and is operatively connected to said movable member; said cylinder having a constantly open air outlet port in its walls located a considerable distance from said closed end, automatic means for opening and closing said port and a leakage port of much smaller cross section adjacent said closed end.

13. A pneumatic apparatus for actuating a movable member of a mechanism adapted to operate the power transmission clutch of a motor car comprising, in combination, a cylinder closed at both ends but connected to the intake manifold of a car motor at one end, an air outlet conduit connected to the other end of said cylinder, a piston in said cylinder and two valve members synchronously movable to open or to close both said manifold connection and said outlet conduit, said cylinder also having a permanently open air outlet port in its walls located a short distance from said outlet conduit opening and a leakage port of much less cross sectional area located adjacent said outlet conduit opening; whereby, when said valve members simultaneously close said intake manifold connection and said outlet conduit the air in the cylinder on the side of the piston facing toward said leakage port may escape rapidly through said air outlet port as said piston moves toward it until said piston laps the same, but thereafter can only escape slowly through said leakage port, thereby delaying the completion of the clutch engaging movement.

14. A pneumatic apparatus for actuating a movable member of a mechanism adapted to operate the power transmission clutch of a motor car comprising, in combination, a cylinder closed at both ends but connected to the intake manifold of the car motor at one end, an air outlet conduit connected to the other end of said cylinder, a piston in said cylinder connected to said movable member and two valve members synchronously movable to simultaneously open said intake manifold connection and said outlet conduit, or to close both.

15. In a motor car having a movable member adapted to operate the power transmission clutch thereof, an internal combustion motor having an intake manifold and throttle therefor connected to a pedal and a spring normally tending to retract said pedal toward a position which will cause said motor to idle, the combination with said above described apparatus, of mechanism adapted to actuate said movable member comprising a cylinder closed at both ends but connected to the intake manifold of the car motor at one end, an air outlet conduit connected to the other end of said cylinder, a piston in said cylinder connected to said movable member and two valve members synchronously movable to simultaneously open said intake manifold connection and said outlet conduit, or to close both, said valves being operatively connected to said pedal so as to be opened by its retraction.

16. A combination such as defined in claim 15 in which the connection between said piston and said movable member is adjustable as to length.

17. In automobile clutch control mechanism the combination, with a clutch control member, an intake manifold, a throttle cooperating therewith, and an accelerator for controlling said throttle, of a pneumatically operating power unit comprising two relatively movable members defining an expansible and contractible suction-responsive chamber therebetween, means for transmitting motion from one of said power unit members to said clutch control member, a conduit for transmitting suction from said intake manifold to said suction-responsive chamber, valve mechanism associated with said conduit for controlling the transmission of suction therethrough, means responsive to said accelerator for controlling said valve mechanism, and means for varying the rate of discharge of air from one part of said pneumatically operating power unit during the motion of said clutch control member in a clutch engaging direction to secure a gradual engagement of the clutch but which permits unrestricted admission of air to said power unit part during motions of said member in a clutch disengaging direction.

18. In automobile clutch control mechanism the combination, with a clutch control member, an intake manifold, a throttle cooperating therewith, and an accelerator for controlling said throttle, of a pneumatically operating power unit comprising a chamber and a wall member movably mounted therein, means for transmitting motion from said wall member to said clutch control member in one direction, a conduit for transmitting suction from said intake manifold to the chamber area at one side of said wall member, valve mechanism associated with said conduit to control the transmission of suction therethrough, means responsive to said accelerator for controlling said valve mechanism, and means for restricting the discharge of air from the chamber area on the other side of said wall member at an intermediate point in the return motion of said clutch control member to secure a gradual engagement of the clutch.

19. In automobile clutch control mechanism the combination, with a clutch control member, an intake manifold, a throttle cooperating therewith and an accelerator for controlling said throttle, of a pneumatically operating power unit comprising two relatively movable members defining an expansible and contractible suction-responsive chamber therebetween, means for transmitting motion from one of said power unit members to said clutch control member in one direction, a conduit for transmitting suction from said intake manifold to said suction-responsive chamber, a valve for controlling the transmission of suction through said conduit, means responsive to said accelerator for controlling said valve, said relatively movable power unit members defining a checking chamber tending to trap air therein in the return motion of said clutch control member, a first valve means operative automatically to restrict the egress of air from said checking chamber at one point in the return motion of said clutch control member, and a second valve means responsive to said accelerator for thereafter controlling the egress of air from said checking chamber.

20. In automobile clutch control mechanism the combination, with a clutch control member, an intake manifold, a throttle cooperating therewith and an accelerator for controlling said throttle, of a pneumatically operating power unit comprising two relatively movable members defining an expansible and contractible suction-responsive chamber therebetween, means for transmitting motion from one of said power unit members to said clutch control member in one direction, a conduit for transmitting suction from said intake manifold to said suction-responsive chamber, a valve for controlling the transmission of suction through said conduit, means responsive to said accelerator for controlling said valve, said relatively movable power unit members defining a checking chamber tending to trap air therein in the return motion of said clutch control member, and two valve devices adapted to perform their control functions in sequence for controlling the discharge of air from said checking chamber, one of which is responsive to movement of said accelerator.

21. In automobile clutch control mechanism the combination, with a clutch control member, of a pneumatically operated power unit comprising a cylinder and a piston therein defining a suction-responsive chamber at one end of said cylinder and a checking chamber at the other end thereof, means for transmitting motion from said piston to said clutch control member, a conduit for transmitting suction from a source of suction on the automobile to said suction-responsive chamber, a valve for controlling the transmission of suction through said conduit, and two independent valve devices for controlling the discharge of air from said checking chamber, one of which is automatically operated synchronously with said piston while the other is automatically adjusted in unison with the movements of said valve for controlling the transmission of suction.

22. Clutch control mechanism for an automotive vehicle comprising a double-ended pressure sensitive fluid motor, a two-part valve mechanism for synchronizing the influx and efflux of air to and from said motor, yieldable means for operating said valve mechanism to control the engagement of the clutch, and means, incorporated in said motor and cooperating with a bleed valve part of said valve means, for predetermining the rate of efflux of air from said motor.

23. In an apparatus for actuating my fluid pressure a movable member of a mechanism adapted to operate a power transmitting clutch such as is employed in motor cars, the combination, with said above described apparatus, of automatic means adapted to produce a relatively rapid flow of the fluid to effect a correspondingly rapid clutch engaging movement of said clutch operating member followed by a relatively slower flow of said fluid during the final stages of said engaging movement, comprising a constantly bled air cushion, and mechanism for causing said air cushion to resist the movement of the clutch operating member after the latter has reached a position which has produced an initial clutch engagement, the connection between said movable member of said clutch operating mechanism and said automatic means being adjustable as to effective length; whereby said connection may be adjusted from time to time to compensate for wear occurring in such clutch which may have correspondingly produced variations in the position of said clutch-operating mechanism which would cause variations in its position of initial clutch engagement.

JAMES H. K. McCOLLUM.
HENRY J. DE N. McCOLLUM.